May 22, 1956 R. M. WALKER 2,747,094

DIVIDING CIRCUIT

Filed Dec. 10, 1945

INVENTOR
ROBERT M. WALKER

BY M. C. Hayes

ATTORNEY

United States Patent Office 2,747,094

Patented May 22, 1956

2,747,094

DIVIDING CIRCUIT

Robert M. Walker, Belmont, Mass., assignor, by mesne assignments, to the United States of America as represented by the Secretary of the Navy Application December 10, 1945, Serial No. 634,109

8 Claims. (Cl. 250—36)

This invention relates generally to frequency dividers, and more particularly, to frequency dividers employing a multivibrator.

Frequency division by means of multivibrators is well known to prior art. Prior art systems, however, have been unstable, and critical as to circuit constants and operating voltages. They have also been very limited in the range of frequency division ratios possible. These are difficulties inherent in the "free-running" type of multivibrator used in prior art systems. Another difficulty arising from the use of a "free-running" type multivibrator for frequency division is the fact that it continues multivibrator action even when the input pulses are not present, a disadvantage where it is desired to frequency divide "blocks" of pulses separated by relatively long time intervals.

The general object of the present invention is to improve multivibrator type frequency dividers by eliminating the foregoing difficulties.

A further object is to provide a frequency divider wherein very stable operation is effected.

Another object is to provide a frequency divider that is insensitive to changes in operating voltages.

A still further object is to provide a frequency divider wherein large frequency division ratios may be produced.

Still another object is to provide a frequency divider very tolerant as to circuit constants.

A still further object is to provide a frequency divider that will divide "blocks" of pulses and remain quiescent between blocks.

These and other objects will be apparent from the following specification taken together with the accompanying drawings, in which.

Figure 1:
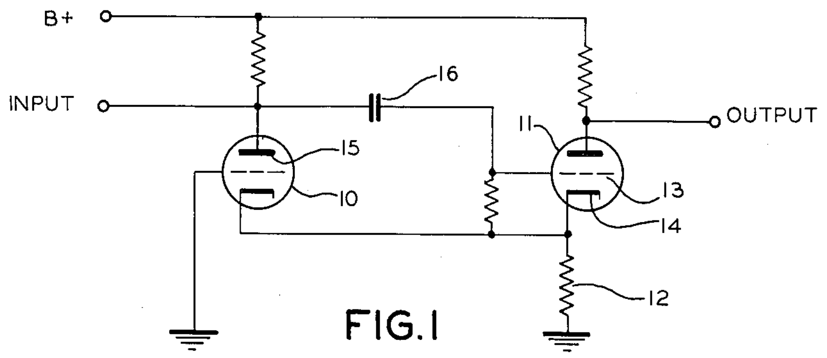
Fig. 1 is a schematic illustration of one embodiment of the invention.

Referring to Fig. 1, vacuum tubes 10 and 11 are connected to form a "one-shot" type multivibrator in which tube 10 in the quiescent state is cut off by the bias developed across cathode resistor 12, and tube 11 conducts due to its grid 13 being returned to its cathode 14. The circuit remains in this condition until the first negative input pulse is applied to plate 15 of tube 10. The negative input pulse causes a drop in voltage at the plate 15 of tube 10, which is coupled through condenser 16 to grid 13 of tube 11, cutting off tube 11. In normal one-shot multivibrator fashion tube 10 is at the same time driven into conduction. Tube 11 remains cut off until the discharge of condenser 16 brings grid 13 above cut-off, at which time tube 11 goes into conduction and the circuit returns to the quiescent condition. During the time condenser 16 is discharging and holding tube 11 cut off, subsequent negative input pulses coupled to grid 13 will have no effect on the circuit. However, once tube 11 has gone back into conduction, the next negative input pulse will again start a cycle of operation. In this way, frequency division is accomplished, those input pulses coming in while tube 11 is cut off being "gated out" and not appearing in the output. The circuit will not "run free" if the input pulses stop, as for example between blocks of pulses.

Figure 2:
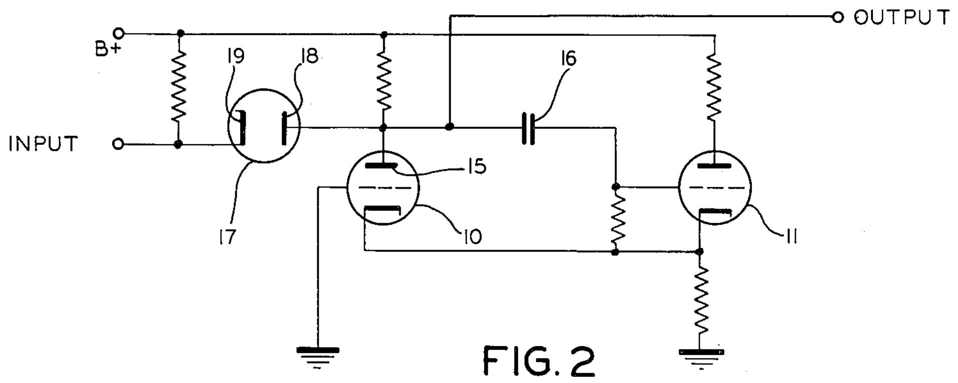
Fig. 2 is a schematic illustration of another embodiment of the invention.

Referring to Fig. 2, vacuum tubes 10 and 11 are connected to form a one-shot multivibrator which operates in general in the manner described for the circuit of Fig. 1, with the following additional feature. A diode tube 17 is so connected in series with the input line to the multivibrator that while the multivibrator is in the quiescent state, plate 18 is essentially at the same potential as cathode 19. When the first negative input pulse is applied to cathode 19 of diode 17 the pulse is passed to plate 15 of tube 10 and normal one-shot multivibrator action starts, with tube 11 cutting off, and tube 10 going into conduction. When tube 10 conducts, the voltage at its plate 15 drops to a low value such that it is much less positive than the potential at cathode 19 of diode 17, hence diode 17 does not conduct, and with the amplitude of input pulses less than the voltage difference across the diode 17, the diode does not pass any further negative pulses until such time as tube 10 is again cut off. This results in a very positive "gating" action, and stabilizes the frequency division.

Figures 3, 4:
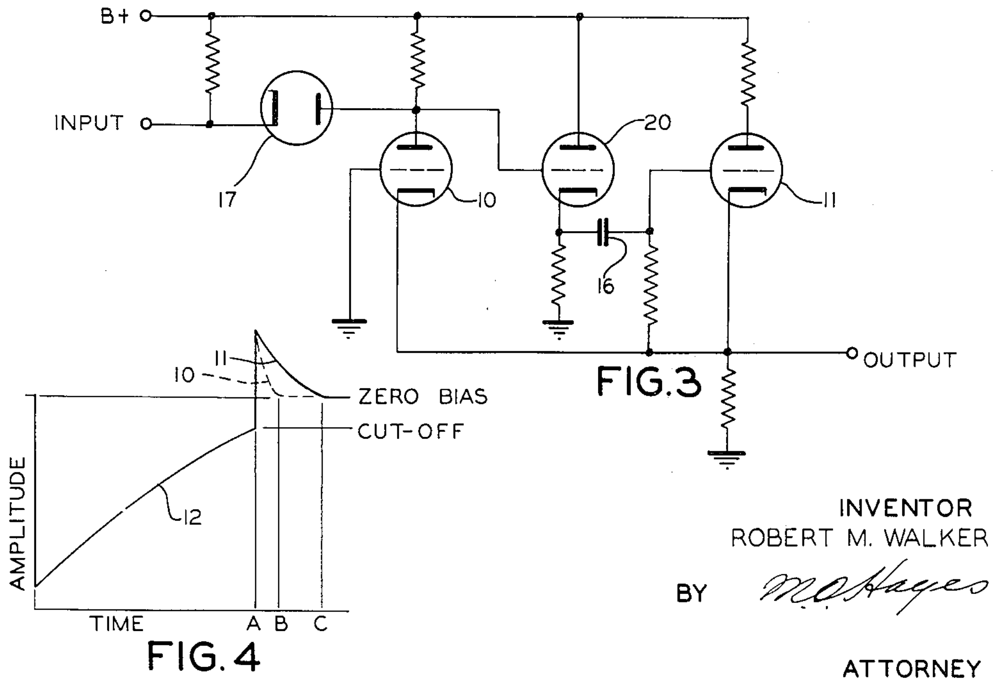
Fig. 3 is a schematic illustration of a further embodiment of the invention.
Fig. 4 is a graph explanatory of the embodiment shown in Fig. 3.

Referring to Fig. 3, vacuum tubes 10 and 11 again are arranged to form a one-shot multivibrator. The circuit operates in a manner similar to the circuit of Fig. 1, but contains the following additional feature. A tube 20 is used as a cathode follower to couple the plate of tube 10 to the grid of tube 11. This shortens the time constant of the discharge of condenser 16 and shortens the transition period between the time the multivibrator is "flopping over" and the time it is in the condition such that the next incoming negative pulse will trigger it. This makes possible a higher duty cycle and a higher maximum frequency division ratio. A further improvement in stability results from the shortened "uncertain" transition period.

The foregoing advantage is illustrated in Fig. 4, in which the grid voltage waveform of the normally conducting multivibrator tube is shown. Relative amplitude is plotted on the vertical axis, and relative time duration on the horizontal axis. Solid curve 12 represents the discharge time of the coupling condenser between the two multivibrator tubes when the normally conducting tube is cut off. Solid curve 11 represents the discharge of the coupling condenser when the normally conducting tube is conducting, and when the cathode follower 20 of Fig. 3 is not used. The time represented between *a* and *c* is the time it takes the multivibrator to return to its quiescent condition such that it can be triggered again. This is the mode of operation of the embodiment shown in Fig. 2. Dotted curve 10 represents the discharge of the coupling condenser with the cathode follower in the circuit as in Fig. 3, and the time represented between *a* and *b* is the time it takes for the multivibrator to return to the quiescent condition. It may be seen then, that the use of the cathode follower reduces the recovery time of the multivibrator, and puts it in condition to be re-triggered sooner, and so increases the ratio of frequency division possible.

Reverting to Fig. 3, a diode 17 is shown connected in series with the input to the multivibrator. This corresponds to the diode in Fig. 2, and functions in the same manner. It will be understood that the cathode follower tube 20 may be used in the circuit of Fig. 1 without diode 17, and that the diode 17 may be used as in Fig. 2 without the cathode follower, their advantages being independent.

The output may be taken from the multivibrator at a number of different points. In Fig. 1 the output terminal is connected to the anode of tube 11. In Fig. 2 it is shown connected to the anode of tube 10. In Fig. 3 it is shown connected to the cathode of tube 11. The output may also be taken from the grid of tube 11, or any other suitable point. It will be understood that while a preferred output connection is shown for each figure, other output connections are possible. For instance, the output connection of Fig. 1 may be used in Figs. 2 and 3.

Referring to Figs. 1, 2 and 3, the negative input pulses are shown applied to the plate of the normally nonconducting tube of the multivibrator. It is to be understood that the multivibrator could be triggered by pulses applied to other appropriate circuit elements. For example, by using for the normally conducting tube one having an additional grid, the input pulses could alternatively be applied to this additional grid.

It is believed that the construction and operation, as well as the advantages of the invention, will be apparent from the foregoing detailed description. It will be understood that while the invention has been shown and described in several preferred forms, changes may be made in the circuits shown without departing from the spirit and scope of the invention as defined in the following claims.

What is claimed is:

1. In a frequency divider circuit comprising a multivibrator having a first tube, a second tube, each of said tubes having at least an anode, a cathode and a grid, first circuit means connecting the anode of the first tube and the grid of the second tube, and second circuit means connecting the output of the second tube with the input of the first tube to control said first tube in response to said output, an input circuit, and a rectifier having one terminal connected to the anode of said first tube and another terminal connected to said input circuit.

2. In a frequency divider circuit comprising a first tube and a second tube interconnected as a multivibrator, each of said tubes having at least an anode, a cathode and a grid, a cathode follower interposed between the anode of said first tube and the grid of said second tube, a rectifier having one terminal connected through circuit means to the anode of said first tube, and an input circuit connected to another terminal of said rectifier.

3. A frequency divider circuit comprising a first tube and a second tube each having cathode, anode and grid, first circuit means connecting the output of said second tube with the input of said first tube to control said first tube in response to said output, second circuit means including a cathode follower connecting the anode of said first tube and the grid of said second tube, a rectifier connected to the anode of said first tube, and an input circuit connected to said rectifier.

4. In combination, a first normally nonconducting tube, a second normally conducting tube, each of said tubes having at least a cathode, an anode and a grid, said cathodes being connected to a reference point through a common resistor, means for applying negative pulses simultaneously to the grid of said second tube and the anode of said first tube, said grid of said first tube also being connected to said reference point, and means for deriving output pulses from said second tube of a frequency substantially less than that of said applied negative pulses.

5. Apparatus as in claim 4, wherein said means for applying negative pulses simultaneously to the grid of said second tube and to the anode of said first tube includes a coupling capacitor connected between said first tube anode and said second tube grid, said coupling capacitor being chargeable by said applied negative pulses.

6. Apparatus as in claim 5, wherein said means for applying negative pulses simultaneously to the grid of said second tube and to the anode of said first tube further includes a diode rectifier, means connecting the anode of said diode to said capacitor, and means for applying said negative pulses to the cathode of said diode.

7. Apparatus as in claim 4, wherein said means for applying negative pulses simultaneously to the grid of said second tube and to the anode of said first tube includes a diode rectifier, means for applying said input pulses to the cathode of said diode, and a cathode follower circuit including a tube having at least a cathode, an anode, and a grid, the grid of said cathode follower tube being connected to the anode of said diode rectifier, the cathode of said cathode follower tube being connected to the grid of said second tube by means of a coupling capacitor.

8. A frequency dividing one-shot multivibrator comprising a normally conducting tube, a normally nonconducting tube, means connecting said tubes including a cathode follower circuit, said cathode follower circuit comprising a third tube having at least an anode, a cathode, and a grid, the anode of said normally nonconducting tube being directly connected to said cathode follower grid, the cathode of said cathode follower being capacitively coupled to the grid of said normally conducting tube, an external source of pulses having a predetermined repetition frequency, means for applying input pulses from said source to said normally conducting tube for cutting off conduction therein, means for maintaining said normally conducting tube in a nonconducting state for a predetermined period greater than the time interval between successive input pulses, and means for deriving a single output pulse each time conduction in said normally conducting tube is cut off.

References Cited in the file of this patent

UNITED STATES PATENTS

| | | |
|---|---|---|
| 1,934,322 | Osbon | Nov. 7, 1933 |
| 2,185,363 | White | Jan. 2, 1940 |
| 2,365,583 | Nagel et al. | Dec. 19, 1944 |
| 2,416,158 | Coykendall | Feb. 18, 1947 |
| 2,461,120 | Loughlin | Feb. 8, 1949 |
| 2,515,271 | Smith et al. | July 18, 1950 |